United States Patent
Wortel et al.

[11] Patent Number: 5,253,074
[45] Date of Patent: Oct. 12, 1993

[54] TEMPERATURE COMPENSATED COLOR LCD PROJECTOR

[75] Inventors: Franciscus J. M. Wortel; Ingrid E. J. R. Heynderickx; Peter E. Wierenga, all of Eindhoven, Netherlands

[73] Assignee: U.S. Philips Corporation, New York, N.Y.

[21] Appl. No.: 810,748

[22] Filed: Dec. 18, 1991

[30] Foreign Application Priority Data

Dec. 19, 1990 [NL] Netherlands .................. 9002808

[51] Int. Cl.⁵ .................................. H04N 5/74
[52] U.S. Cl. .............................. 358/236; 359/86; 345/101
[58] Field of Search ............ 358/231, 236, 60; 340/713, 784 A1, 784 F; 359/86

[56] References Cited

U.S. PATENT DOCUMENTS

| | | | |
|---|---|---|---|
| 4,031,529 | 6/1977 | Borel et al. | 340/713 |
| 4,045,791 | 8/1977 | Fukai et al. | 340/713 R |
| 4,328,493 | 5/1982 | Shanks et al. | 340/713 X |
| 4,639,722 | 1/1987 | Urabe et al. | 340/713 X |
| 5,012,274 | 4/1991 | Dolgoff | 340/784 A1 |
| 5,029,982 | 7/1991 | Nash | 340/713 X |

FOREIGN PATENT DOCUMENTS

| | | |
|---|---|---|
| 311116 | 4/1989 | European Pat. Off. . |
| 363767 | 4/1990 | European Pat. Off. . |
| 390511 | 10/1990 | European Pat. Off. . |
| 8901503 | 1/1991 | Netherlands . |

*Primary Examiner*—Mark R. Powell
*Attorney, Agent, or Firm*—Norman N. Spain

[57] ABSTRACT

In a projection display device based on one or more (twisted nematic) LCDs (4), simple temperature compensation is possible by optimizing the d.Δn value (n) at the maximal operating temperature. The associated transmission/voltage characteristics at different temperatures then extend substantially parallel so that it is possible to compensate for temperature changes by means of a simple voltage compensation.

14 Claims, 2 Drawing Sheets

TEMPERATURE COMPENSATED COLOR LCD PROJECTOR

BACKGROUND OF THE INVENTION

The invention relates to a projection display device comprising at least one liquid crystal display device having a layer of liquid crystalline material between two supporting plates provided with electrodes which define at least one pixel, via which electrodes a voltage can be applied across the pixel.

A device of this type is used, for example, in projection television and for other video applications.

The invention also relates to a liquid crystal display device for use in such a device.

When using liquid crystal display devices for color projection display, a display panel having, for example, red, green and blue pixels on one panel can be used. The optical system for this device is simpler than for devices in which a separate display device is used for each color and in which the resultant pictures are projected one across the other on a screen. In the latter type it is possible to design each panel optimally from an optical point of view by optimizing for each of the three colors the optical path length $d.\Delta n$ (d: thickness of liquid crystal layer; $\Delta n$: difference in refractive index between ordinary and extraordinary wave) for the central wavelength associated with this color.

At the central wavelength for red, green and blue $\lambda_R$, $\lambda_G$ and $\lambda_B$ such thicknesses $d_R$, $d_G$, $d_B$ and $\Delta n$ values $\Delta n_R$, $\Delta n_G$ and $\Delta n_B$ are chosen that $$\frac{d_R \cdot \Delta n_R}{\lambda_R} = \frac{d_G \cdot \Delta n_G}{\lambda_G} = \frac{d_B \cdot \Delta n_B}{\lambda_B} = 0.87$$

(or the value of another Gooch and Tarry extremum).

This can be effected, for example, by varying the cell thickness for a selected material having a given $\Delta n$ or by selecting a different liquid crystal material for each colour for a selected fixed thickness. However, this leads to superfluous storage and production control problems.

EP-A 0,311,116 describes a solution to these problems, with the transmission for each one of the three colours red, green and blue being optimized by adjusting the polarizers for each colour differently with respect to each other, which polarizers are present at both sides of the layer of liquid crystalline material. The values of d and $\Delta n$ are then chosen to be such that it holds for green $\lambda_G$ at the central wavelength that:

$$d \cdot \Delta n = \frac{\sqrt{3} \cdot \lambda_G}{2}.$$

For parallel polarizers the transmission is zero at zero voltage. For the blue and red light paths the same values of d and $\Delta n$ are used, but the mutual position of the polarizers is shifted.

A first drawback is that the highest value of the transmission for blue and red is not optimum because the polarizers are no longer parallel.

Moreover, it appears that a shifting of the polarizer positions is necessary due to the temperature dependence, notably of $\Delta n$, at temperature variations (particularly an increase of temperature which may be caused by the high beam intensity in projection display). This is effected in the relevant device by rotating the polarizers with respect to each other so that also for the green beam they are no longer parallel, which has a detrimental effect on the transmission.

The influence of the temperature on the transmission curves can be very different due to the different rotations of the polarizers so that for the three different colors the maximum transmission at the highest operating temperature may vary considerably as a percentage of the maximum transmission at room temperature.

Moreover, the mechanical adjustment of the polarizers relative to one another is slow and cumbersome.

SUMMARY OF THE INVENTION

One of the objects of the present invention is to provide a device of the type described in the opening paragraph in which the above-mentioned problems occur hardly, if at all. It is a further object of the invention to provide a device in which one type of display device is sufficient in the case where three light paths for red, green and blue are used by providing a device which is substantially insensitive to temperature variations.

For this purpose a device according to the invention is characterized in that in at least one of the extreme transmission states in the product $d.\Delta n$ of the thickness d the layer of liquid crystalline material and the difference in refractive index $\Delta n$ are chosen to be such that $d.\Delta n$ at the maximum temperature of use is 0.45–0.50 $\mu$m, the device being also provided with means for correcting the value of an applied voltage in dependence on the temperature.

The electrodes preferably define a matrix of pixels arranged in rows and columns in which the column electrodes are driven by means of corrected or uncorrected data voltages when a row of pixels is being selectively driven.

According to the invention the $d.\Delta n$ values at the maximum operating temperature are chosen to be such that in the temperature range to be used the variation of $d.\Delta n$ remains limited to a range in the Gooch and Tarry curve where the transmission for (a) given wavelength(s) changes hardly, if at all, while $d\Delta n$ may still change considerably. In fact, the above-mentioned conditions are still satisfied for $d.\Delta n$ values at 20° C. between 0.50 and 0.65 $\mu$m. The liquid crystal display device is preferably present between mutually perpendicularly crossed polarizers and the extreme state is light-transmissive.

The correction values of the voltages in a device according to the invention are temperature-dependent, but in the range to be used they are almost independent of the voltage (the transmission/voltage curves run substantially parallel for different temperatures). These correction values can then be determined in a simple manner by means of, for example, temperature measurement. On the other hand the correction values can be determined with reference to the transmitted light intensity, for example, in a test element located outside the actual display section, which element is continuously held in its extreme transmission state. Light intensity changes caused by temperature changes then define the correction values.

Such corrections for temperature changes can be simultaneously superimposed on possible corrections for wavelength-dependent behaviour (in a three-channel system); to have optimum results preferably for the cell passing red light at the maximum operating temperature $$\frac{d \cdot \Delta n}{\lambda} = 0.87$$

is chosen.

BRIEF DESCRIPTION OF THE DRAWING

FIG. 3 shows diagrammatically transmission/voltage characteristics of a display device according to the invention at different temperatures, while

DETAILED DESCRIPTION OF THE INVENTION

The invention will now be described in greater detail with reference to the drawings and an embodiment.

Figure 1:
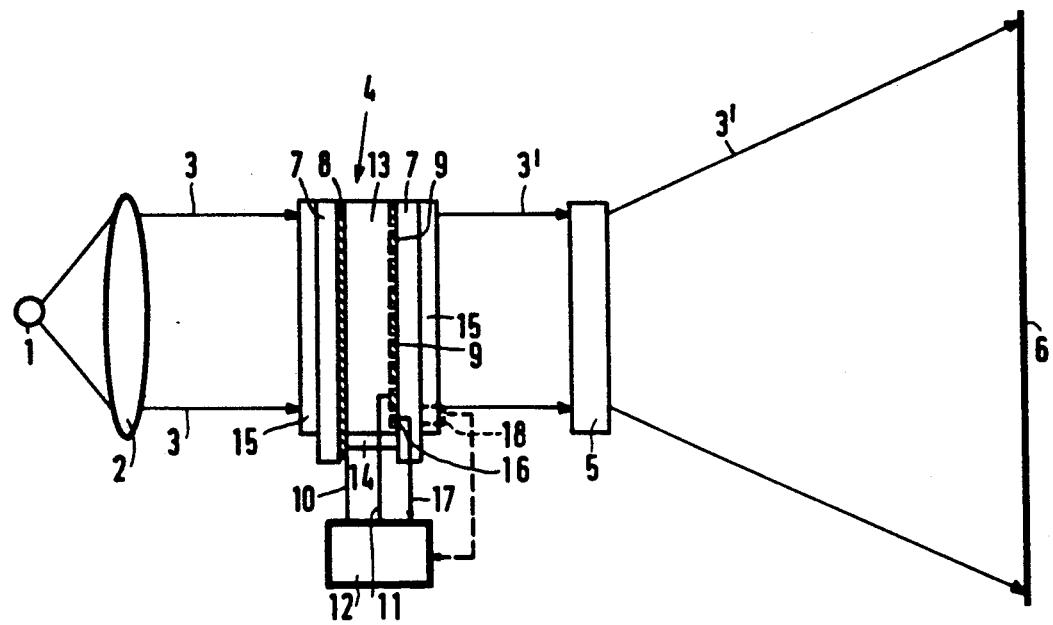
FIG. 1 shows diagrammatically a device according to the invention.

FIG. 1 shows diagrammatically a projection display device in which light emitted by a light source 1 is formed to a substantially parallel light beam 3 through a collimator lens 2. The light beam 3 is incident on a liquid crystal display device 4 and is modulated in this device. The modulated light is then projected on a screen 6 through a lens system 5.

In this embodiment the liquid crystal display device 4 has two transparent substrates 7 of, for example, glass which are provided with row electrodes 8 and column electrodes 9, respectively. The row and column electrodes are provided with selection voltages and data voltages by the drive unit 12 through drive lines 10, 11. A liquid crystal material 13 is present between the two substrates which are provided with protective coatings and/or orientation layers. The substrates are spaced apart by spacers (not shown) and a sealing edge 14. The liquid crystal display device 4 is also provided with polarizers 15 which cross each other perpendicularly in this embodiment. If a twisted nematic liquid crystal effect with a twist angle of 90° is used, the display device 4 will entirely pass the incident light beam 3 (at voltages below a given threshold), while the light beam is entirely absorbed at a given saturation voltage. Dependent on the voltages at the row and column electrodes the modulated light beam 3' is passed and subsequently projected. Although in this embodiment a projection device is shown in which only one light path is used, devices are also feasible in which a plurality of light paths and/or light sources (one for each color) is used.

Figure 2:
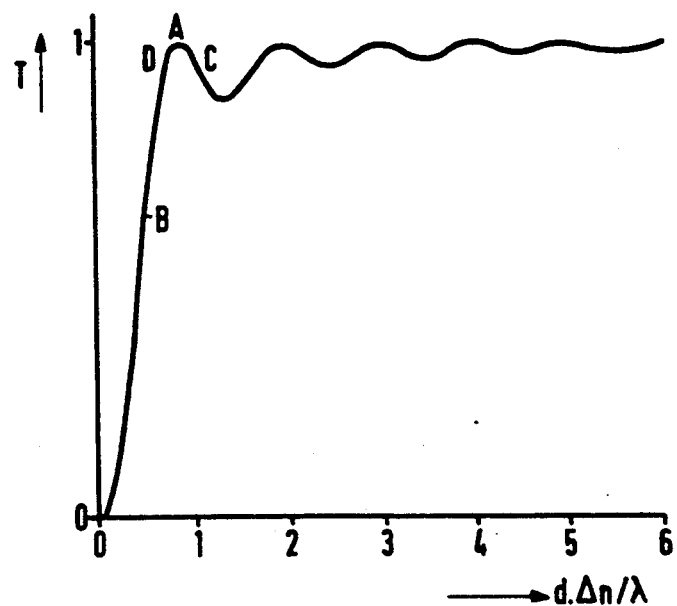
FIG. 2 shows diagrammatically the transmission of a display device as a function of $d.\Delta n/\lambda$.

FIG. 2 shows the transmission of a liquid crystalline medium (c.q a pixel in the display device 4) as a function of $d.\Delta n/\lambda$ between crossed polarizers. In this example the liquid crystal material was ZLI 88-1068 of the firm of Merck. For this material $\Delta n$ at 20° C. is approximately 0.12 (at $\lambda = 590$ nm). When $d = 3.9$ μm is chosen, $d.\Delta n = 0.47$ μm. At a central wavelength of 590 nm for green light it then holds that $d.\Delta n/\lambda = 0.87$, in other words the display device comprising, for example, 3 light paths is used in the first Gooch and Tarry maximum (point A) for green. With an increasing temperature, however, $\Delta n$ decreases to such an extent that the display device at 80° C. is adjusted, as it were, at point B so that for the same wavelength a maximum transmission remains which is approximately 60% of that at 20° C. By starting from $d.\Delta n/\lambda = 0.8$ (point D) at 80° C. according to the invention, in other words by selecting $d.\Delta n \approx 0.47$ μm for the maximum temperature of use, the transmission is substantially maximal at 590 nm. Though $d.\Delta n$ has increased at 20° C. to such a value that $d.\Delta n/\lambda > 1$, the transmission has hardly decreased (point C in FIG. 2).

Similar considerations apply to other colors.

The associated values of $d.\Delta n$ at 20° C. are now 0.50–0.65 μm (for the conventional color range).

Figure 3:
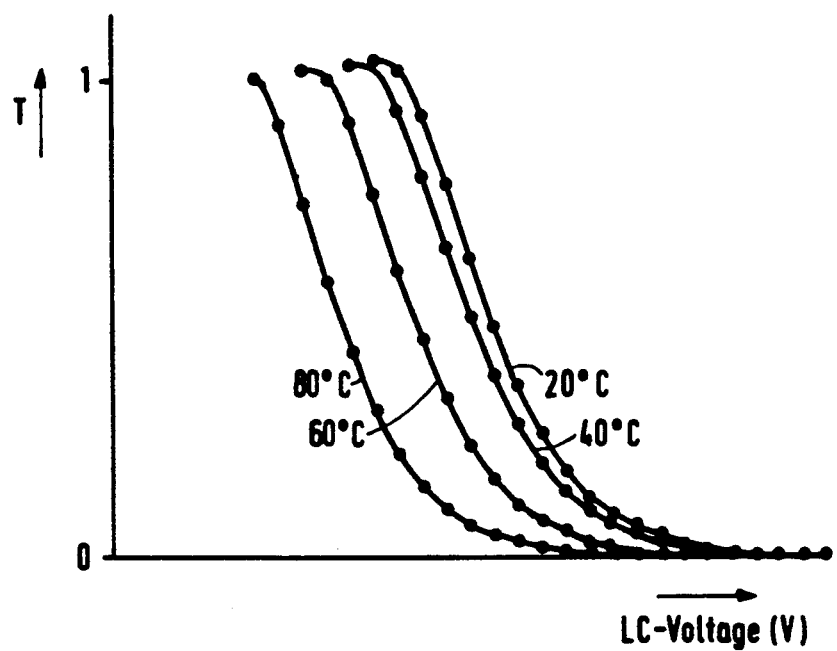

FIG. 3 shows the transmission/voltage characteristics for the green channel in such a display device 4. Here the thickness is approximately 5 μm. It is clearly apparent that the maximum transmission for the different temperatures (20° C., 40° C., 60° C., 80° C.) has changed hardly at all. There is a shift in the characteristics, but substantially throughout the range it is such that the curves run parallel; this means that a simple electronic compensation (for example, adding a correction voltage to the column electrodes) may be sufficient.

Similar curves hold true in a projection device for the red and blue channels.

Figure 4:
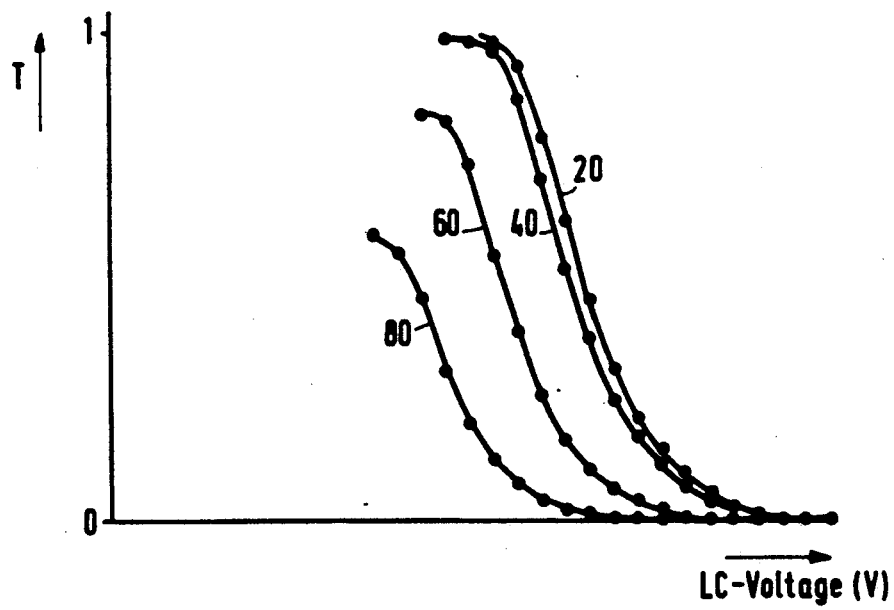
FIG. 4 shows similar characteristics for a conventional display device.

The adaptation of $d.\Delta n$ at the maximum operating temperature thus results in the maximum transmission remaining the same throughout the temperature range. As a result, the transmission/voltage curves also remain substantially parallel, in contrast to devices in which $d.\Delta n$ is optimized at room temperature. In such display devices these curves exhibit a behaviour that is shown diagrammatically in FIG. 4. A simple adaptation by adding a positive or negative correction voltage is not possible in this case.

For making such a correction the device of FIG. 1 has a temperature sensor 16, for example, a thermocouple which supplies a signal through the line 17 to the drive unit 12 in which the corrected data voltage is determined. Instead of the temperature variation the variation in the transmitted quantity of light can also be measured by means of an optical sensor 18 (shown in broken lines) by means of an extra pixel which is always transmissive.

The invention is of course not limited to the example shown, but several variations are possible within the scope of the invention.

As has been started here before, it is possible to optimize for one central wavelength when using a single light path and a multicolour display device 4. The optimization shown may also be achieved for a liquid crystal material between polarizers which are parallel instead of mutually perpendicular. Other forms of sensors are alternatively possible, such as a bimetal or a temperature-sensitive resistor, diode, or the like.

We claim:

1. A projection display device comprising at least one liquid crystal display device having a layer of liquid crystalline material between two supporting plates provided with electrodes which define at least one pixel, via which electrodes a voltage can be applied across the pixel, characterized in that in at least one of the extreme transmission states the product $d.\Delta n$ of the thickness d of the layer of liquid crystalline material and the difference in refractive index $\Delta n$ is chosen to be such that $d.\Delta n$ at the maximum temperature of use is 0.45–0.50 μm, the device being also provided with means for correcting the value of an applied voltage in dependence on the temperature.

2. A device as claimed in claim 1, characterized in that the electrodes define a matrix of pixels arranged in rows and columns, in which the column electrodes are driven by means of corrected or uncorrected data voltages when a row of pixels is being selectively driven.

3. A device as claimed in claim 1, characterized in that the liquid crystal display device is present between mutually perpendicularly crossed polarizers and is light-transmissive in an extreme state.

4. A device as claimed in claim 1, characterized in that the maximal temperature of use of the liquid crystalline material is 80° C.

5. A device as claimed in claim 1, characterized in that the product $d.\Delta n$ at room temperature (20° C.) is between 0.50 and 0.65 $\mu$m.

6. A device as claimed in claim 1, characterized in that a correction value for the voltages is determined by means of temperature measurement in the liquid crystal display device, and in that a measured temperature difference is converted into a correction signal.

7. A device as claimed in claim 1, characterized in that a correction value for the voltages are determined by mean of light intensity measurement after the light has passed through the liquid crystal display device and in that a measured light intensity difference is converted into a correction signal.

8. A liquid crystal display device for use in a device as claimed in claim 6, characterized in that the liquid crystal display device also comprises a thermocouple, a temperature sensor or a temperature-sensitive resistor.

9. A liquid crystal display device for use in a device as claimed in claim 7, characterized in that the liquid crystal display device is provided with an optical sensor and a pixel which is always light-transmissive.

10. A device as claimed in claim 2, characterized in that the liquid crystal display device is present between mutually perpendicularly crossed polarizers and is light-transmissive in extreme state.

11. A device as claimed claim 3, characterized in that the maximal temperature of use of the liquid crystalline material is 80° C.

12. A device as claimed in claim 4, characterized in that the product $d.\Delta n$ at room temperature (20° C.) is between 0.50 and 0.65 $\mu$m.

13. A device as claimed in claim 3, characterized in that a correction value for the voltages is determined by means of a temperature measurement in the liquid crystal device, and in that a measured temperature difference is converted into a correction signal.

14. A device as claimed in claim 3, characterized in that a correction value for the voltages are determined by means of a light intensity measurement after the light has passed through the liquid crystal display device and in that a measured light intensity difference is converted into a correction signal.

* * * * *